United States Patent
Scapin

(10) Patent No.: US 10,094,402 B2
(45) Date of Patent: Oct. 9, 2018

(54) WORKTOP FOR PIECES OF FURNITURE AND METHOD FOR JOINING SLABS SO AS TO OBTAIN SAID WORKTOP

(71) Applicant: MARMO ARREDO S.P.A., Fontaniva (PD) (IT)

(72) Inventor: Romeo Scapin, Tombolo (IT)

(73) Assignee: Marmo Arredo S.P.A., Fontaniva (PD) (IT)

(*) Notice: Subject to any disclaimer, the term of this patent is extended or adjusted under 35 U.S.C. 154(b) by 0 days.

(21) Appl. No.: 15/512,719

(22) PCT Filed: Sep. 23, 2014

(86) PCT No.: PCT/IB2014/064775
§ 371 (c)(1),
(2) Date: Mar. 20, 2017

(87) PCT Pub. No.: WO2016/046598
PCT Pub. Date: Mar. 31, 2016

(65) Prior Publication Data
US 2017/0306996 A1    Oct. 26, 2017

(51) Int. Cl.
*F16B 5/00* (2006.01)
*F16B 12/04* (2006.01)
(Continued)

(52) U.S. Cl.
CPC .......... *F16B 5/0024* (2013.01); *A47B 77/022* (2013.01); *A47B 96/18* (2013.01); *F16B 12/04* (2013.01); *A47B 2077/025* (2013.01)

(58) Field of Classification Search
CPC ...... A47B 87/00; A47B 87/002; F16B 5/0024
(Continued)

(56) References Cited

U.S. PATENT DOCUMENTS

| | | | |
|---|---|---|---|
| 2,257,001 A * | 9/1941 | Davis | B28B 1/002 211/182 |
| 3,150,032 A * | 9/1964 | Rubenstein | B29C 70/023 108/161 |

(Continued)

FOREIGN PATENT DOCUMENTS

| | | |
|---|---|---|
| EP | 0 552 510 A2 | 12/1992 |
| FR | 2 815 680 A1 | 4/2002 |

(Continued)

OTHER PUBLICATIONS

International Search Report and Written Opinion dated Jun. 18, 2015, issued in PCT Application No. PCT/IB2014/064775, filed Sep. 23, 2014.

*Primary Examiner* — Jose V Chen
(74) *Attorney, Agent, or Firm* — Workman Nydegger

(57) ABSTRACT

A worktop (1) for pieces of furniture includes two slabs (3, 4) made of stone, arranged so that they are adjacent to each other at the level of corresponding head surfaces (5, 6) in order to define a work surface (2) exposed to the outside. A joining arrangement is suited to stably connect the slabs (3, 4) and includes a first bonding substance (8) interposed between the head surfaces (5, 6) and recesses (9) obtained on the head surfaces (5, 6) of each slab (3, 4), mutually facing each other and configured in such a way as to define corresponding housings completely delimited in the direction of the thickness of the slabs (3, 4), the first bonding substance (8) being spread mainly in the housings.

12 Claims, 4 Drawing Sheets

(51) Int. Cl.
*A47B 96/18* (2006.01)
*A47B 77/02* (2006.01)

(58) Field of Classification Search
USPC .......... 108/64, 161, 65, 66, 69; 52/599, 605
See application file for complete search history.

(56) References Cited

U.S. PATENT DOCUMENTS

| | | | | |
|---|---|---|---|---|
| 3,680,277 A | * | 8/1972 | Martin | E04B 1/6154 52/438 |
| 4,158,335 A | * | 6/1979 | Belcastro | A47B 87/002 108/64 |
| 4,878,439 A | * | 11/1989 | Samson | A47B 1/08 108/64 |
| 5,253,932 A | * | 10/1993 | Nesovic | A47B 96/18 108/27 |
| 5,339,747 A | * | 8/1994 | Epps | A47B 13/021 108/64 |
| 5,595,126 A | * | 1/1997 | Yeh | A47B 13/10 108/64 |
| 6,085,668 A | * | 7/2000 | Kanki | A47B 87/002 108/64 |
| 6,382,109 B1 | * | 5/2002 | Novikoff | A47B 87/002 108/65 |
| 6,676,327 B2 | * | 1/2004 | Baugh | F16B 1/005 403/31 |
| 6,729,091 B1 | * | 5/2004 | Martensson | E04F 15/04 446/112 |
| 6,918,341 B1 | * | 7/2005 | Welsch | A47B 96/06 108/180 |
| 8,904,732 B2 | * | 12/2014 | Chen | B28B 3/26 52/287.1 |
| 2007/0216052 A1 | * | 9/2007 | Jecker | A47B 77/022 264/31 |
| 2011/0293361 A1 | * | 12/2011 | Olofsson | E04B 1/6125 403/266 |
| 2014/0117004 A1 | * | 5/2014 | Sambonet | A47B 13/16 219/218 |

FOREIGN PATENT DOCUMENTS

GB         553693      1/1943
GB    1 203 305      8/1970

* cited by examiner

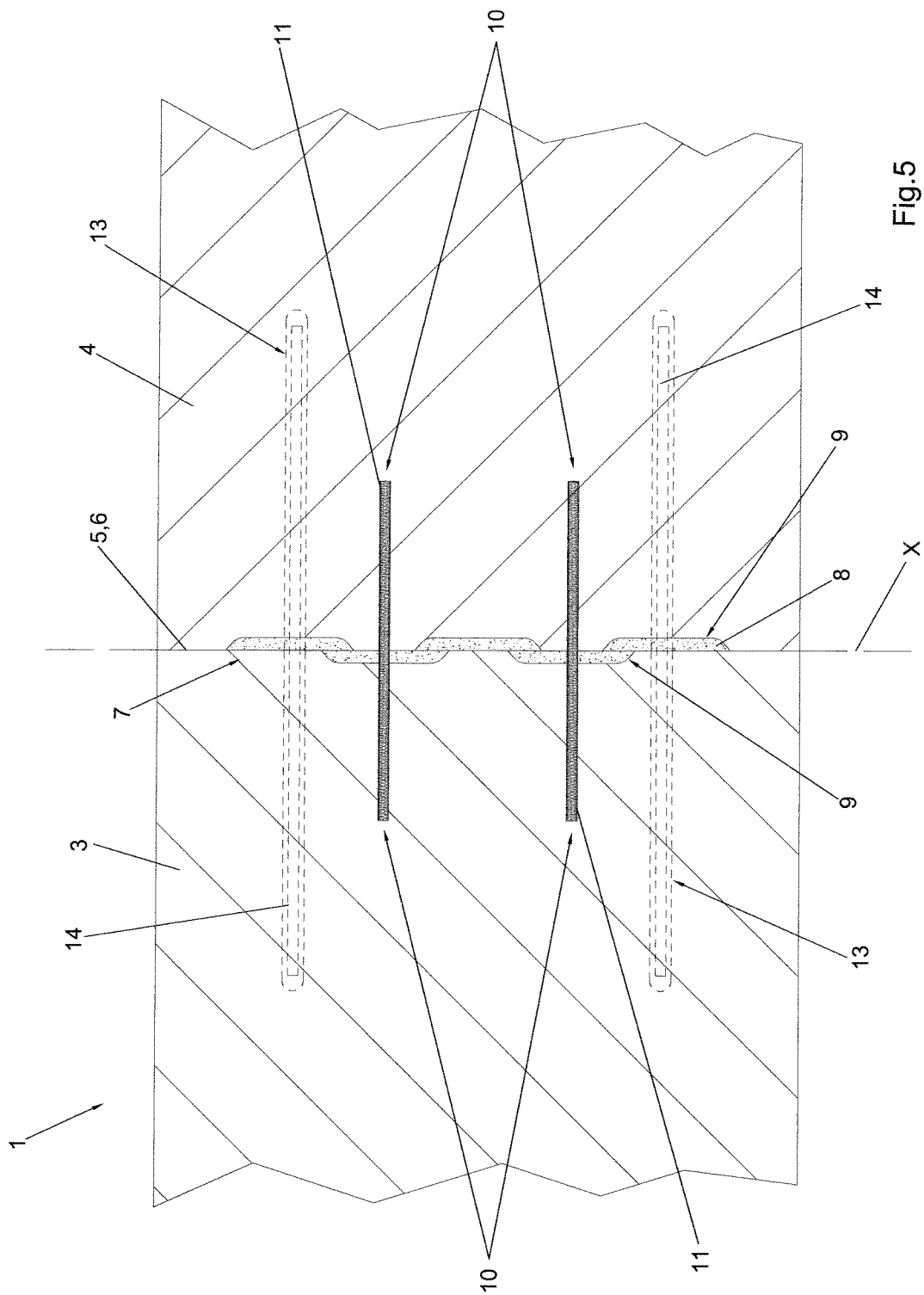

WORKTOP FOR PIECES OF FURNITURE AND METHOD FOR JOINING SLABS SO AS TO OBTAIN SAID WORKTOP

BACKGROUND OF THE INVENTION

1. Field of the Invention

The present invention concerns a worktop that is particularly suited to be used on pieces of furniture, especially for kitchens, bathrooms and the like.

The present invention concerns also a method for joining slabs in such a way as to obtain said worktop.

2. Present State of the Art

As is known, some pieces of furniture for kitchens, bathrooms or the like are provided with a worktop that comprises slabs made of stone like, for example, granite, marble, resin-based agglomerate and similar materials.

Said slabs are generally available on the market in standard sizes. To make a worktop for pieces of furniture these slabs are therefore cut to size and processed according to the need.

However, in some cases, the pieces of furniture are larger than the standard size of the slabs.

In this case, two or more slabs are joined by placing them adjacent to each other with the sides where thickness is measured, after interposing a layer of a bonding substance.

In particular, said bonding substance is spread mainly inside a slit obtained by bevelling the external corners of the two slabs and placing the two bevelled edges obtained in this way so that they face each other.

The known art described above poses the drawback that, once the joining operation has been completed, the bonding substance appears on the outside as a line of discontinuity between the two slabs, which affects the overall aesthetic aspect of the worktop.

SUMMARY OF THE INVENTION

It is the object of the present invention to provide a worktop made of stone whose size is larger than the standard size of the slabs available on the market, in which the joining lines between two adjacent slabs are not visible from the outside.

It is also the object of the present invention to provide a method for making said joint.

Said objects are achieved by a worktop made according to claim 1.

Said objects are also achieved by a method for joining two slabs made of stone according to claim 8.

Further characteristics and details of the invention are described in the corresponding dependent claims.

Advantageously, the invention makes it possible to produce a worktop having any size and a surface without discontinuities.

BRIEF DESCRIPTION OF THE DRAWINGS

Said objects and advantages, together with others that are mentioned below, are highlighted in the description of a preferred embodiment of the invention that is provided by way of example without limitation, with reference to the attached drawings, wherein:

FIG. 5 shows the worktop of FIG. 1 in a section view carried out according to the section plane V-V.

DETAILED DESCRIPTION OF THE PREFERRED EMBODIMENTS

Figure 1:
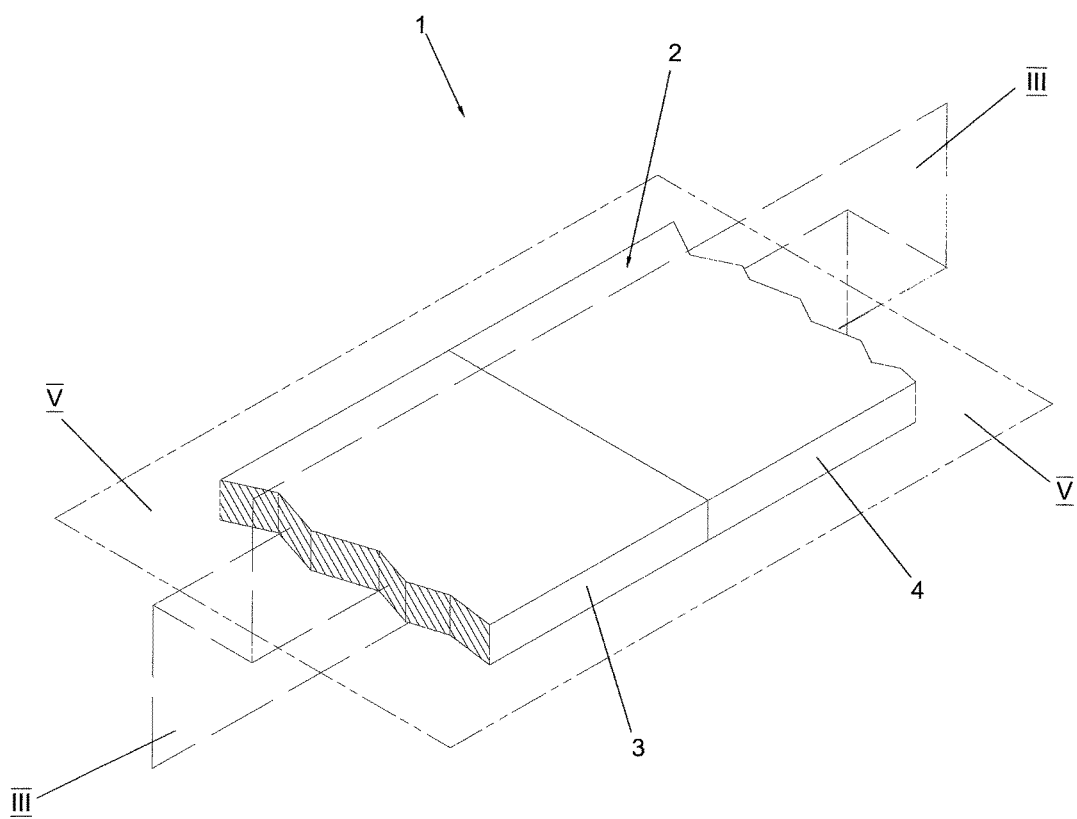
FIG. 1 shows an axonometric view of the worktop that is the subject of the invention.

The worktop that is the subject of the invention, particularly suited to be used on pieces of furniture for kitchens, bathrooms and the like, is indicated as a whole by the reference number 1 in FIG. 1.

Said worktop is constituted by two slabs 3, 4 made of stone, arranged side by side at the level of corresponding head surfaces 5, 6 that extend according to the thickness of the slabs 3, 4 and have mutually matching shapes.

It is evident that the invention can be extended to worktops constituted by any number of slabs, even more than two.

Preferably, the slabs 3, 4 are made of an agglomerate material, meaning any mixture of resin and a stone material like, for example, quartz, cement, marble, ceramic and similar materials.

Compared to natural stone materials, said agglomerate materials offer several advantages such as, for example, mechanical and thermal resistance, chemical resistance, ease of processing and a low cost.

A further advantage offered by said agglomerate materials derives from the fact that they are without veins and have a homogeneous surface texture that allows the two slabs 3, 4 to be placed side by side in any mutual position without considerable surface discontinuities.

It is evident, on the other hand, that in variant embodiments of the invention said slabs 3, 4 can be made of any stone material, even natural, such as granite, marble and the like.

Said slabs 3, 4 are stably connected at the level of said head surfaces 5, 6 through joining means 7, in such a way as to define a work surface 2 intended to be visible in the finished product.

In particular, said joining means 7 comprise a first bonding substance 8 interposed between the head surfaces 5, 6 of the slabs 3, 4.

Figure 2:
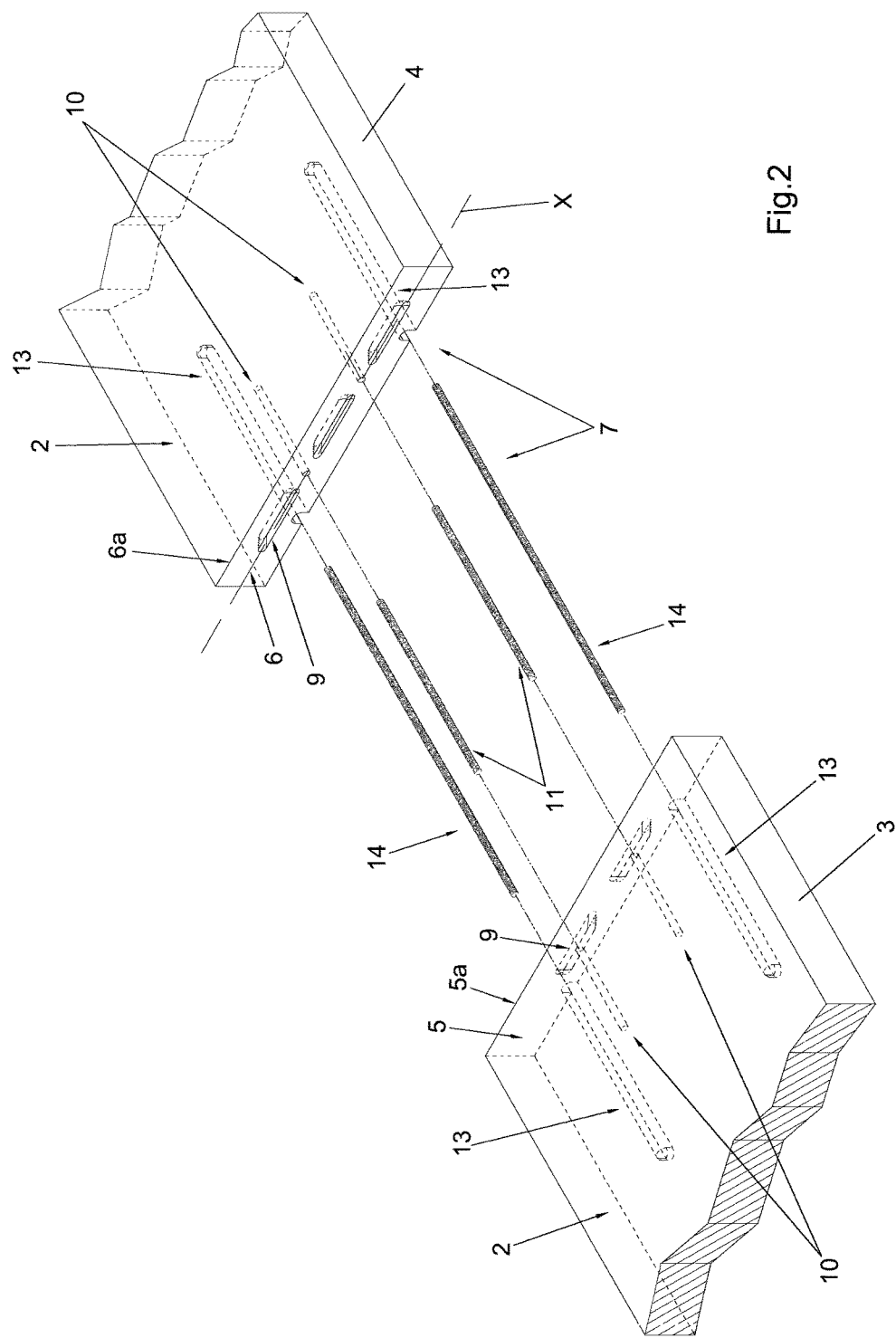
FIG. 2 shows an exploded axonometric view of the worktop shown in FIG. 1.

The joining means 7 comprise a plurality of recesses 9 obtained in the head surface 5, 6 of each slab 3, 4, visible in detail in the exploded view of FIG. 2. The number of recesses 9 is selected by the manufacturer based on the size of the slabs 3, 4 to be connected and there can be any number of recesses. In any case, the positions and shapes of the recesses 9 are such that when the two slabs 3, 4 are positioned so that they are adjacent to each other the recesses 9 of a slab 3 are in communication with the recesses 9 of the other slab 4 so as to form corresponding housings that are completely delimited according to the direction of the thickness of the slabs 3, 4, as can be observed in the section views shown in Figures from 3 to 5.

Figure 3:
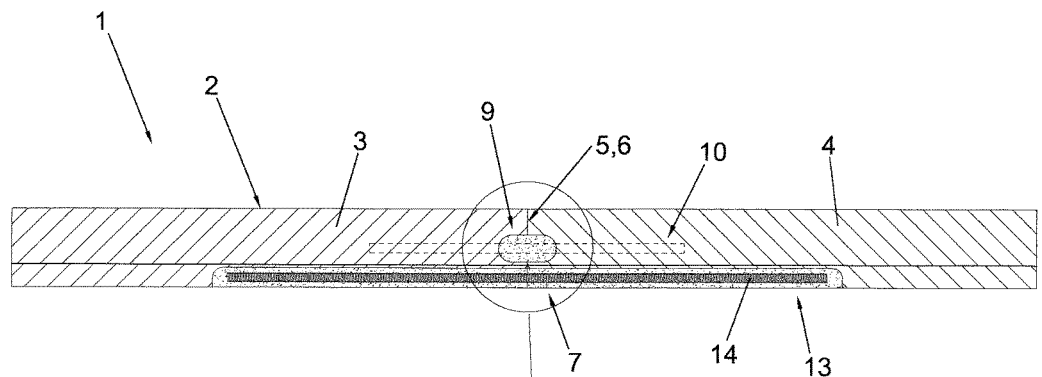
FIG. 3 shows the worktop of FIG. 1 in a section view carried out according to the broken section surface III-III.
Figure 4:
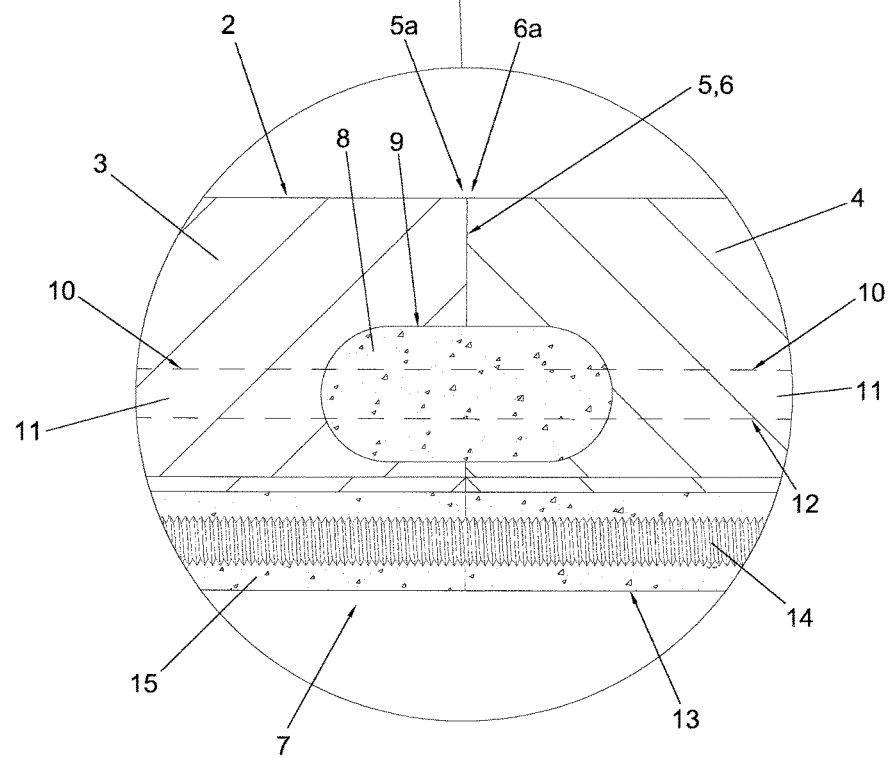
FIG. 4 shows a detail of FIG. 3.

It should be noted since now that the section views shown in FIGS. 3 and 4 are carried out according to a broken surface III-III, shown in FIG. 1, in such a way that the upper portion and the lower portion of the slabs 3, 4 are sectioned according to respective planes that are offset with respect to each other.

The first bonding substance 8 can be confined to said housings and, therefore, within the thickness of the slabs 3, 4.

This makes it possible to avoid bevelling the external corners of the head surfaces 5, 6, as it happens in the known art previously described, thus allowing the corners to be arranged so that they are perfectly adjacent to each other.

This prevents the creation of a visible separation line constituted by the first bonding substance 8, thus achieving the object to maintain the surface continuity of the work surface 2.

Preferably, the first bonding substance 8 is an acrylic glue of a type known in the field of stone processing.

Still preferably, the colour of the first bonding substance 8 is equal to one of the colours of the work surface 2.

In this way, advantageously, it is possible to reduce the visual impact of possible bubbles of first bonding substance 8 that should fill microporosities and/or small surface imperfections on the head surfaces 5, 6.

As regards the recesses 9, preferably and as can be observed in FIG. 2, each one of them has an elongated shape according to a direction of development X that is perpendicular to the direction of the thickness of the slabs 3, 4.

Said configuration can be easily obtained by creating the recesses 9 by means of an abrasive disc whose rotation axis is parallel to the respective head surface 5, 6.

Preferably but not necessarily, the height of the recesses 9 according to the direction of the thickness of the slabs 3, 4 is included between one fifth and one third of the thickness of the slabs themselves.

Still preferably, the average depth of the recesses 9 is included between 0.5 and 2 times said height.

Although the proportions just indicated above are not limiting, it has been observed that they constitute a good compromise between the need for a stable joint and the need to limit the quantity of bonding substance used and the processing costs for the creation of the recesses 9.

As can be observed in FIG. 5, the recesses 9 belonging to either one of the two slabs 3, 4 are arranged in such a way that they are offset with respect to the recesses 9 belonging to the other slab along the direction of development X and their lengths according to the direction of development X are such that each one of them communicates, at its two ends, with two corresponding recesses 9 of the other slab.

With the configuration described above, the coupling of the recesses 9 of the two slabs 3, 4 defines a continuous housing, in such a way that the first bonding substance 8 assumes the shape of a single seam, possibly extending over the entire width of the worktop 1, with the advantage of increasing the resistance of the joint.

Preferably, the joining means 7 also comprise one or more elongated reference elements 11, each one of which is arranged in said slabs 3, 4 in such a way as to cross the respective head surfaces 5, 6.

More precisely, each reference element 11 is housed in a seat that is defined by two blind holes 10, visible in FIG. 2, respectively made in the two head surfaces 5, 6 of the slabs 3, 4 and arranged so that they face each other.

The reference elements 11 are stably connected to each slab 3, 4 through a second bonding substance 12 spread in said blind holes 10 that is preferably but not necessarily equal to the first bonding substance 8.

Advantageously, said reference elements 11 make it possible to reinforce the joint and, in particular, they prevent any relative movement between the two slabs 3, 4 both during the making of the joint and afterwards.

Still advantageously, said reference elements 11 increase the bending strength of the joint.

Preferably, each reference element 11 has a rough surface, which offers the advantage of enhancing the grip of the bonding substance.

Even more preferably, each reference element 11 is a threaded bar that offers the advantage of being easily available on the market and of having a rough surface suitable for the gripping function mentioned above.

Preferably, the joining means 7 comprise also one or more grooves 13, each one of which is obtained on the surface opposite the work surface 2 of the worktop 1 and extends over both of the slabs 3, 4 through the corresponding head surfaces 5, 6.

Each groove 13 is filled with a third bonding substance 15, preferably but not necessarily equal to the first two bonding substances 8, 12, in which a corresponding elongated reinforcing element 14 is buried.

Advantageously, said reinforcing element 14 further increases the mechanical resistance of the joint.

Preferably, the reference elements 11 and the reinforcing elements 14 are made of a metallic material or another material having equivalent resistance.

Regarding the head surfaces 5 and 6, each one of them preferably forms a right angle with the work surface 2.

Advantageously, the creation of said right angle is possible using the machine tools that are generally used for processing stone slabs.

Furthermore, the right angle makes it possible to press the two slabs 3, 4 more effectively against each other while making the joint, in order to guarantee the best possible contact between the slabs and, finally, limit the formation of interfaces of first bonding substance 8 that may give origin to surface discontinuity lines.

It is also evident that in variant embodiments of the invention, for example in the case where the two slabs 3, 4 must be connected so as to form a corner, one or both of the head surfaces 5, 6 can form an angle different from a right angle with the work surface 2.

In this case, special shaped dies that allow the two slabs 3, 4 to be effectively pressed against each other can however be made.

In practice, the joint between the two slabs 3, 4 described above is obtained by first making the recesses 9 and, where planned, the blind holes 10 in the head surfaces 5, 6 of the slabs 3, 4.

Preferably, each head surface 5, 6 is polished, with the advantage of increasing coupling precision between the two slabs 3, 4, so that they match each other perfectly.

Furthermore, preferably, each head surface 5, 6 is processed in such a way as to create a sharp edge 5a, 6a at the level of the work surface 2.

Advantageously, said sharp edge 5a, 6a further enhances coupling precision between the two slabs 3, 4 at the level of the work surface 2, thus improving the aesthetic result that can be obtained.

Following said processing of the head surfaces 5, 6, the first bonding substance 8 is deposited in the recesses 9 in a quantity sufficient to fill them when the slabs have been placed side by side.

If necessary, if there are reference elements 11, these are inserted in the blind holes 10 together with the second bonding substance 12.

Successively, the slabs 3, 4 are arranged with the corresponding head surfaces 5, 6 mutually in contact with each other and the solidification of the first bonding substance 8 is awaited.

Said positioning operation is preferably carried out by pressing the slabs 3, 4 against each other, in such a way that the respective head surfaces 5, 6 match each other perfectly and that any excess of bonding substance 8, 12 is squeezed outwards, beyond the surface of the slabs 3, 4, from where it can successively be removed.

Preferably, once the first bonding substance 8 has solidified, the work surface 2 obtained in this way is subjected to a polishing operation, especially at the level of the joint.

Advantageously, said polishing operation eliminates any roughness at the level of the joint, to further advantage of the final aesthetic aspect of the joint. According to the explanation provided above, it can be understood that the worktop described above, as well as the corresponding method suited to obtain it, achieve the object of the invention.

In particular, the presence of the recesses obtained on the head surfaces of the two slabs avoids the need to spread the bonding substance so that it can be seen, giving the worktop a continuous aspect also at the level of the joint. Further embodiments of the invention, although neither described herein nor illustrated in the drawings, must all be considered protected by the present patent, provided that they fall within the scope of the following claims.

The invention claimed is:

1. A worktop for pieces of furniture, comprising:
   two slabs made of stone, the two slabs comprising a first slab and a second slab each terminating at a head surface that extends between opposing side surfaces and that extends between a top surface and an opposing bottom surface, the first slab and the second slab each having a direction of development that projects between the opposing side surfaces and a direction of thickness that projects from the head surface into the corresponding slab between the top surface and the bottom surface so as to be perpendicular to the direction of development, the two slabs being disposed so that the head surfaces are opposingly facing, wherein the two slabs cooperate to define a work surface;
   joining means for connecting the two slabs to each other and comprising a first bonding substance interposed between the head surfaces;
   the joining means further comprising one or more first recesses formed on the head surface of the first slab and one or more second recesses formed on the head surface of the second slab, the one or more first recesses at least partially facing the one or more second recesses along the direction of thickness to form housings completely delimited in the direction of thickness of the slabs, the first bonding substance being disposed within the housings,
   wherein the first recesses are offset from the second recesses along the direction of development so that at least one of the first recesses communicates with two of the second recesses and at least one of the second recesses communicates with two of the first recesses.

2. The worktop according to claim 1, wherein each one of the first recesses and the second recesses has an elongated shape according to the direction of development that is perpendicular to the direction of thickness.

3. The worktop according to claim 1, wherein said joining means further comprises:
   a blind hole made in the head surface of the first slab and facing a blind hole made in the head surface of the second slab;
   a reference element having an elongated shape, the reference element being disposed within the blind hole of the first slab and the blind hole of the second slab;
   a second bonding substance disposed in the blind hole of the first slab and the blind hole of the second slab in order to permanently join the reference element to the two slabs.

4. The worktop according to claim 3, wherein the reference element is a threaded bar.

5. The worktop according to claim 1, wherein the joining means further comprises:
   a groove formed on the bottom surface of the first slab and extending through the head surface thereof and facing a groove formed on the bottom surface of the second slab and extending through the head surface thereof;
   a reinforcing element having an elongated shape, the reinforcing element being disposed within the groove of the first slab and the groove of the second slab;
   a third bonding substance disposed within the groove of the first slab and the groove of the second slab so as to secure the reinforcing element to the two slabs.

6. The worktop according to claim 1, wherein the first bonding substance has a color equal to a color of the work surface.

7. The worktop according to claim 1, wherein the head surface of the first slab forms a right angle with respect to the top surface of the first slab and the head surface of the second slab forms a right angle with respect to the top surface of the second slab.

8. A method for joining two slabs made of stone, the two slabs comprising a first slab and a second slab each terminating at a head surface that extends between opposing side surfaces and that extends between a top surface and an opposing bottom surface, the first slab and the second slab each having a direction of development that projects between the opposing side surfaces and a direction of thickness that projects from the head surface into the corresponding slab between the top surface and the bottom surface so as to be perpendicular to the direction of development, one or more first recesses being formed on the head surface of the first slab so as to be delimited according to the direction of thickness and one or more second recesses being formed on the head surface of the second slab so as to be delimited according to the direction of thickness, the method comprising:
   spreading a first bonding substance in the first recesses and the second recesses;
   arranging the head surfaces of the first slab so as to be in contact with the head surface of the second slab,
   wherein the one or more first recesses are at least partially facing the one or more second recesses along the direction of thickness to form housings completely delimited in the direction of thickness of the slabs, the first bonding substance being disposed within the housings, and
   wherein the first recesses are offset from the second recesses along the direction of development so that at least one of the first recesses communicates with two of the second recesses and at least one of the second recesses communicates with two of the first recesses;
   waiting until said first bonding substance has solidified.

9. The method according to claim 8, wherein the arranging the head surface of the first slab so as to be in contact with the head surface of the second slab is obtained by pressing the two slabs against each other, so as to squeeze any excess quantity of the first bonding substance outside a thickness of the two slabs.

10. The method according to claim 8, wherein the head surfaces of the first slab and the head surface of the second slab are obtained through a polishing operation.

11. The method according to claim 8, further comprising creating a sharp edge on the head surface of the first slab and on the head surface of the second slab before placing the two slabs in contact with each other.

12. The method according to claim 8, wherein once the first bonding substance has solidified, a work surface belonging to both the first slab and the second slab and extending across the head surfaces is subjected to a polishing operation.

* * * * *